(12) United States Patent
Robinson

(10) Patent No.: US 7,004,432 B2
(45) Date of Patent: Feb. 28, 2006

(54) AIRCRAFT FLAP EXTENSION MECHANISM

(75) Inventor: Philip I Robinson, Stockport (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 10/451,383

(22) PCT Filed: Nov. 13, 2001

(86) PCT No.: PCT/GB01/04984

§ 371 (c)(1),
(2), (4) Date: Jun. 23, 2003

(87) PCT Pub. No.: WO02/062660

PCT Pub. Date: Aug. 15, 2002

(65) Prior Publication Data

US 2004/0065783 A1   Apr. 8, 2004

(30) Foreign Application Priority Data

Dec. 22, 2000   (GB) .................................... 0031442

(51) Int. Cl.
*B64C 9/16*   (2006.01)

(52) U.S. Cl. .................. 244/211; 244/213; 244/215; 244/216

(58) Field of Classification Search ........ 244/211–216, 244/219
See application file for complete search history.

(56) References Cited

U.S. PATENT DOCUMENTS

| | | | |
|---|---|---|---|
| 3,438,599 A | 4/1969 | Welzen | |
| 3,698,664 A | 10/1972 | Bonney | |
| 4,881,704 A | 11/1989 | Hofrichter | |
| 4,995,575 A | 2/1991 | Stephenson | |
| 5,230,487 A * | 7/1993 | Gartelmann et al. | 244/216 |
| 6,457,680 B1 * | 10/2002 | Dobrzynski et al. | 244/210 |

* cited by examiner

*Primary Examiner*—J. Woodrow Eldred
(74) *Attorney, Agent, or Firm*—Nixon & Vanderhye P.C.

(57) ABSTRACT

An aircraft mechanism including a flap positioning mechanism comprising a carriage and track system suitable for use with variable radius or multiple curvature tracks.

19 Claims, 3 Drawing Sheets

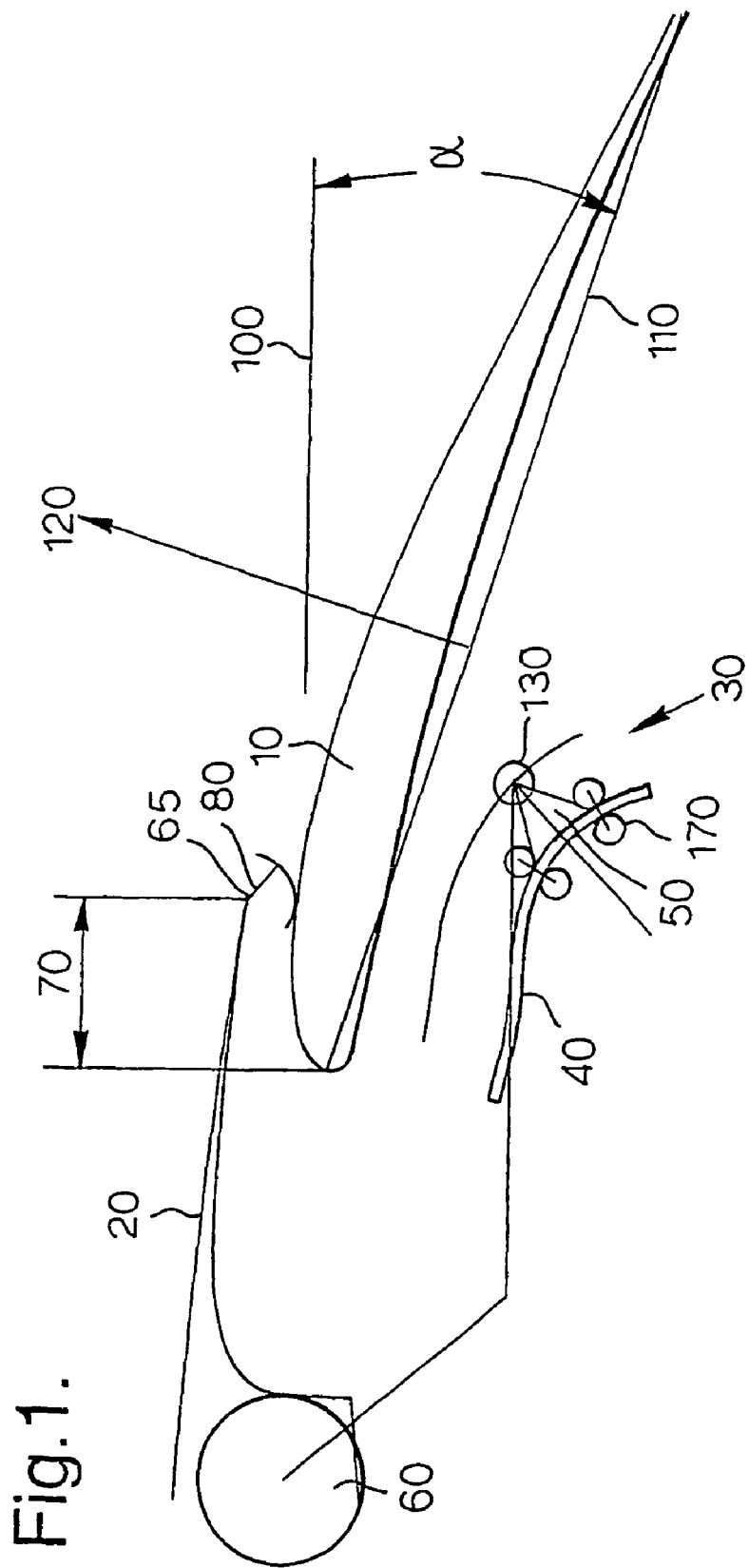

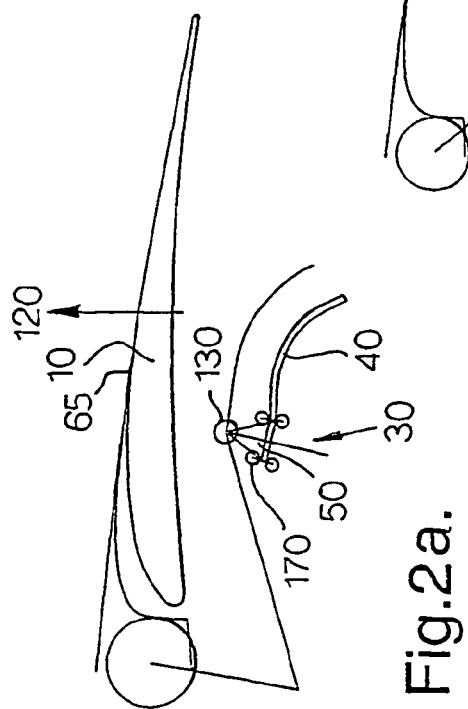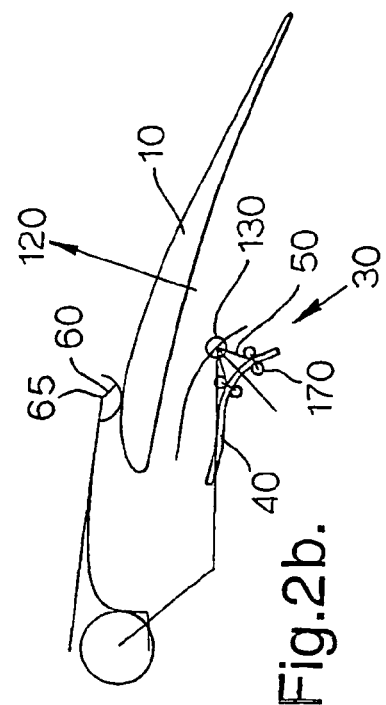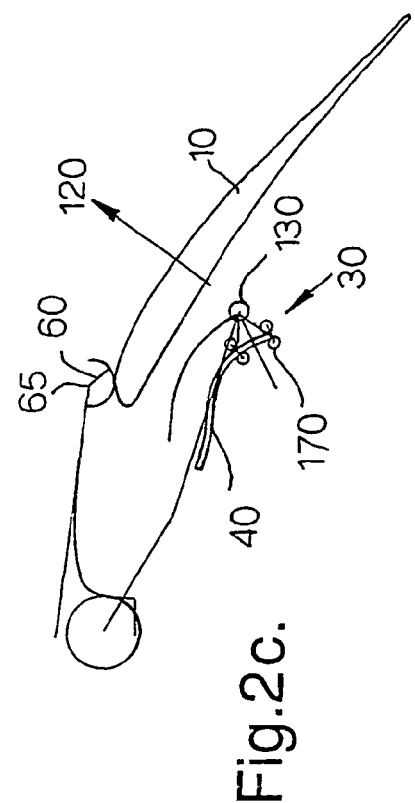

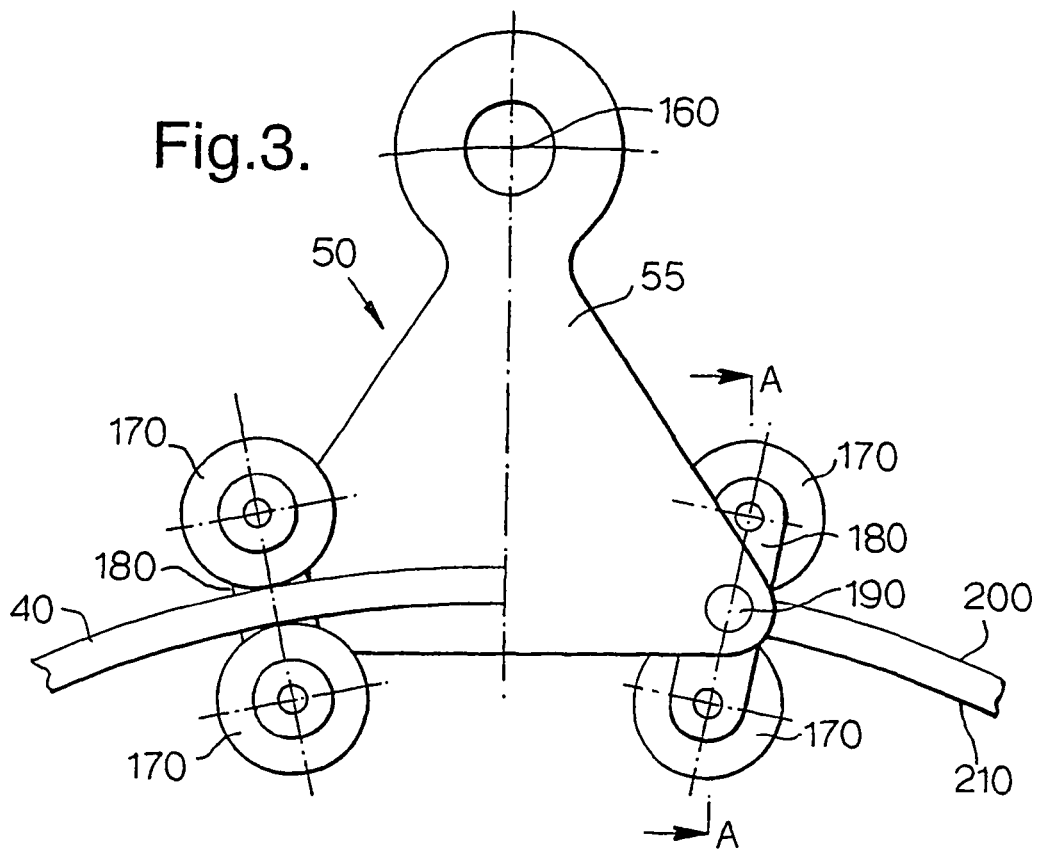
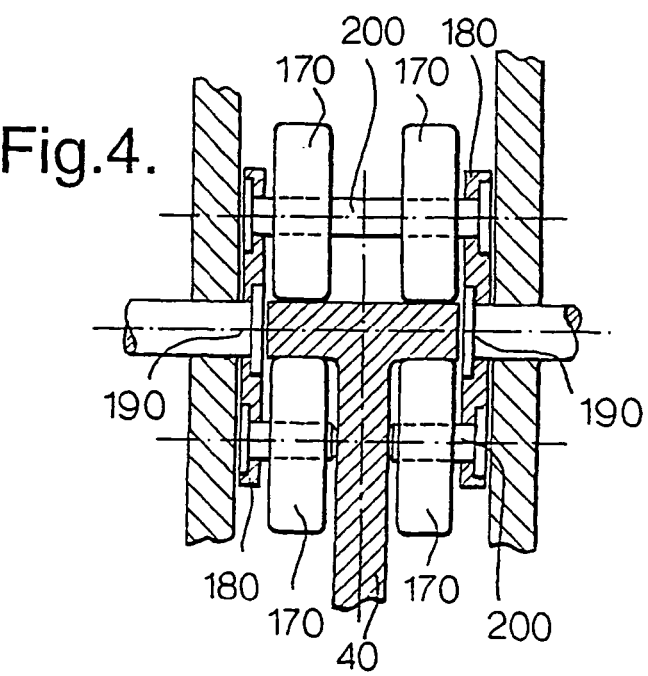

AIRCRAFT FLAP EXTENSION MECHANISM

This application is the US national phase of international application PCT/GB01/04984 filed 13 Nov. 2001, which designated the US.

The present invention relates to an aircraft flap and is particularly concerned with an aircraft leading or trailing edge flap deployment mechanism.

Most modern aircraft have a wing section that is optimised to produce low drag at cruising speed. In most cases such an optimised wing section will not provide the high lift capability required during the take-off and landing phases of flight. Flap systems are used to provide the high lift capability required and these effectively increase the camber and sometimes the area of the wing when the flap is deployed. During the take-off phase of flight the requirement is for high lift capability with minimal increase in drag, whilst in the landing phase the requirement is for high lift capability and drag inducement in order to reduce the forward speed of the aircraft. Flaps may also be deployed in other phases of flight to increase lift.

Each phase of flight may require different flap settings. The geometric variables controlled by deployment of the flap are:
Lap—the overlap between the wing and the flap
Gap—the gap between the leading or trailing edge of the wing and the nearest point of the flap
Deployment angle—the angle between a horizontal reference and a chord line of the flap.

A mechanism is required that will position a flap in order to achieve the correct lap, gap and deployment angle settings. Many such mechanisms rely on a track system to provide translational movement of the flap in which the flap is mounted on a carriage for rolling movement along a track. The track is of constant thickness and has opposed rolling surfaces thereon and the carriage is movable along the track on at least two pairs of rollers, each pair of rollers having one roller running on each opposed rolling surface and the rollers in each pair being maintained at a separation from one another, usually by a rigid connecting link, whereby to maintain both rollers in rolling contact with their respective track rolling surfaces at all times. The carriage is thus allowed to move smoothly along the track and to deploy the flap as required. Many different constant radius track profiles can be produced for a three position system. However, there is only one combination of carriage pivot offset from the flap surface, and an offset along the chordwise axial flap that will generate a straight line track. Other combinations generate a constant radius track profile, however, in many cases it becomes necessary to modify these track profiles owing to:

A foul of the flap structure with other wing structure owing to the arc the pivot point moves through and the path the flap thus takes.

The loads on the flap mechanism are too great to allow a feasible design to be produced owing to the carriage pivot point being too far away from the line of action of the applied aerodynamic load. Designing a track based mechanism to withstand these loads would in all probability require a mechanism that would be unacceptably heavy and large.

The flap mechanism should desirably be contained within the wing box. Many possible constant radius track profile mechanisms, especially of thin wing sections, are not contained by the wing box.

Such modified track profiles have a variable radius or multiple curvature track, often having a flattened 'S' shape profile. Existing single carriage track systems are only viable for either a constant radius or linear track profile as the sets of rollers will not otherwise be able to maintain freely rotatable movement along the track.

Currently where constant radius tracks are not suitable other, more complex mechanisms are used. One such mechanism utilises a track having first and second straight sections (sections of infinite radius) connected by a section of track having constant radius. First and second carriages are linked together and mounted on sets of rollers, each of the sets of rollers having a roller in contact with one of two opposed rolling surfaces of the track, each pair of rollers connected by a link or arm. The rollers are positioned on the track to be freely rotatable along the track at all times. The second carriage has a single pair of rollers. The carriages are pivotally connected to the flap, the pivotal connection of the second carriage being further aft than that of the said first carriage. The carriages both move along the said first section of infinite radius track. At the end of the first section of infinite radius track, the first carriage stops whilst the second carriage is free to move along the constant radius section of track and the second section of infinite radius track. Thus at the end of the first section of infinite radius track, the pivotal connection of the first carriage is fixed in position and acts as a pivot point for the flap as the flap is moved into position by the second carriage moving along the constant radius section and the second section of infinite radius track. It will be appreciated by the reader that the above described mechanism is more complex than the single carriage mechanism. Also it is not always possible to design feasible mechanisms as described above for the required flap deployment settings.

An object of the present invention is to produce a simpler flap deployment mechanism suitable for use with a track of variable radius profile (multiple curvature).

According to a first aspect of the present invention there is provided an aircraft flap arrangement in which the flap is deployable between a first stowed, or "cruise" position and a second deployed position, the deployment movement including translational movement of the flap for which the flap is mounted on a carriage for rolling movement along a track, the track having opposed rolling surfaces thereon and the carriage being movable along the track on at least two pairs of rollers, each pair of rollers having one roller running on each opposed rolling surface and the rollers in each pair being linked by a connecting means that maintains the roller in each pair of rollers at a fixed distance apart in use, the connecting means is pivotally mounted to the carriage such that when the track is of multiple curvature the connecting means pivots about the carriage maintaining both said rollers in each said pair of rollers in rolling contact with their respective track rolling surface at all times.

The connecting means preferably comprises means to articulate at least one roller in the said at least one pair about an articulation axis spaced from the rolling axis of the said roller whereby a line connecting the rolling axes of the pair of rollers will pass through both points of contact of the rollers with the track.

The articulation axis is preferably equidistant between the rolling axes of the rollers in the said pair and the pivotal connection of the set of rollers to the carriage will enable the rollers to freely rotate along tracks of different profiles including tracks with variable radius profiles, including S-shaped profiles, whilst maintaining rolling contact with the surface of the track. This will ensure the correct position and orientation of the carriage and therefore the flap.

It is further preferred that at least one of the pairs of rollers comprises an adjustment means to allow the distance between the rollers to be adjusted. The adjustment means will help minimise wear and allow the carriage to be adjusted to take account of any initial tolerances in the system. There may be said adjustment means on all of the pairs of rollers. The adjustment means may conveniently be a cam style adjuster.

An alternative embodiment may include roller displacement means which comprises means to separate the two rollers in a given pair by an amount dependent upon the degree of curvature change of the track experienced by that pair of rollers.

Thus the said pair of rollers may have a sensor or guide in contact with the track immediately adjacent the wheels in that pair which senses curvature changes in the track as the carriage moves along and, by a mechanical or other, for example electrical, connection causes the said dependent separation movement of the pair of rollers.

According to a second aspect of the present invention there is provided an aircraft wing having a flap deployment mechanism according to the first aspect of the present invention.

According to a third aspect of the present invention there is provided an aircraft having a wing according to the second aspect of the present invention.

A preferred embodiment of the present invention will now be described by way of example only and with reference to the accompanying drawings in which:

FIG. 1 is a diagramatical representation of a flap and deployment arrangement or mechanism according to the invention showing the geometric relationships between the ring, the flap and the flap deployment mechanism;

FIG. 2a is a diagramatical representation of the flap and deployment mechanism at FIG. 1 shown in its stowed position;

FIG. 2b is a diagramatical representation of the flap and deployment mechanism of FIG. 1 shown in a deployed take-off position;

FIG. 2c is a diagramatical representation of the flap and deployment mechanism of FIG. 1 shown in a deployed landing position;

FIG. 3 shows a partial cross-section through a carriage according to one embodiment of the present invention;

FIG. 4 shows a cross-section of FIG. 3 through the line A—A to an enlarged scale;

Referring firstly to FIG. 1 there is shown a flap 10 deployed from a wing 20 by a flap deployment mechanism 30 comprising a double sided track 40 and a carriage 50 moved by a drive system 60. The exact flap deployment is determined by several geometric relationships set up to give the correct aerodynamic performance and characteristics of the flap 10. The relevant geometric relationships are an overlap distance of the wing 20 and flap 10, measured longitudinally of the aircraft, and known as the lap 70, a gap between the trailing edge of the wing 65 and the nearest point of the flap 10, known as the gap 80 and an angle α between the horizontal reference 100 and a chordline 110 of the flap 10. The main cause of loading on the carriage 50 is owing to the aerodynamic load 120 on the flap 10. To minimise the loading on the carriage 50 a pivotal connection 130 of the carriage should be kept as close to the line of action of the applied aerodynamic load 120 as possible. The pivotal connection 130 should not be outboard of the line of action of the applied aerodynamic load 120 at any time. If the pivotal connection 130 were to be outboard of the aerodynamic load 120, any moment caused by the aerodynamic load 120 would tend to further deploy the flap 10.

FIGS. 2a, 2b and 2c show typical flap deployment positions for a three position system. FIG. 2a shows a stowed position, FIG. 2b shows a take-off position and FIG. 2c shows a landing position. In all three Figures the positions of the flap 10, the carriage 50 and its pivotal connection 130 and the direction of the aerodynamic load 120 are shown. FIGS. 2b and 2c also show the gap between the wing trailing edge 65 and the closest point of the flap 10.

FIG. 3 shows one design of carriage 50 according to the present invention on a track 40. The carriage comprises a carriage body 55 and a pivotal flap connection 160 and rollers 170. The rollers 170 disposed on opposed rolling surfaces 200, 210 of the track 40 are connected by an arm 180. A roller pair articulated axis 190 at a pivotal connection of the carriage 50 and the arm 180 allows the carriage 50 to pivot as the rollers move over a variable radius track so that the rollers 170 are able to freely rotate at all times.

Referring to FIG. 4, there is shown a cross-section of the carriage 50 and track 40 and one set of rollers 170 with their axles 200. The roller articulaltion connection 190 pivotally connects the carriage 50 to the arm 180 and allows the rollers to freely rotate as the carriage 50 moves along a variable radius track.

What is claimed is:

1. A flap deployment mechanism for an aircraft flap arrangement in which the flap is deployable between a first stowed, or "cruise" position and a second deployed position, the deployment movement including translational movement of the flap for which the flap is mounted on a carriage for rolling movement along a track, the track having opposed rolling surfaces thereon and the carriage being movable along the track on at least two pairs of rollers, each pair of rollers having one roller running on each opposed rolling surface and the rollers in each pair being linked by a connecting means that maintains the roller in each pair of rollers at a fixed distance apart in use, the connecting means is pivotally mounted to the carriage such that when the track is of multiple curvature the connecting means pivots about the carriage maintaining both said rollers in each said pair of rollers in rolling contact with their respective track rolling surface at all times.

2. A flap deployment mechanism as claimed in claim 1 wherein the track system has a variable radius profile.

3. A flap deployment mechanism as claimed in claim 2 wherein the track system has an "S" shaped profile.

4. A flap deployment mechanism as claimed in claim 1 wherein each of the at least two pairs of rollers comprises an adjustment means to allow the distance between the said rollers disposed on opposite sides of the track to be adjusted.

5. A flap deployment mechanism as claimed in claim 4 wherein each of the pairs of rollers comprises said adjustment means.

6. A flap deployment mechanism as claimed in claim 4 wherein the adjustment means is a cam style adjuster.

7. An aircraft wing having a flap deployment mechanism according to claim 1.

8. An aircraft having a wing according to claim 7.

9. A flap deployment mechanism for an aircraft flap arrangement in which the flap is deployable between a first stowed, or "cruise" position and a second deployed position, the deployment mechanism comprising:
 a single track having opposed rolling surfaces thereon;
 a carriage with said flap mounted on said carriage, the carriage including at least two pairs of rollers for rolling along said rolling surfaces of said single track causing translational movement of the flap, each pair of rollers having one roller running on each opposed rolling surface;

connecting means for linking the rollers in each pair, said connecting means maintaining the rollers in each pair of rollers a fixed distance apart; and means for pivotally mounting the connecting means to the carriage wherein the connecting means pivots about the carriage maintaining both said rollers in each said pair of rollers in rolling contact with their respective track rolling surface at all times during deployment movement.

10. A flap deployment mechanism as claimed in claim 9 wherein the track system has a variable radius profile.

11. A flap deployment mechanism as claimed in claim 10 wherein the track system has an "S" shaped profile.

12. A flap deployment mechanism as claimed in claim 9 wherein each of the at least two pairs of rollers comprises an adjustment means for allowing the distance between the said rollers disposed on opposite sides of the track to be adjusted.

13. A flap deployment mechanism as claimed in claim 12 wherein each of the pairs of rollers includes said adjustment means.

14. A flap deployment mechanism as claimed in claim 12 wherein the adjustment means is a cam style adjuster.

15. An aircraft wing having a flap deployment mechanism according to claim 9.

16. An aircraft having a wing according to claim 15.

17. An aircraft flap arrangement in which the flap is deployable between a first stowed, or "cruise" position and a second deployed position, the deployment movement including translational movement of the flap for which the flap is mounted on a carriage for rolling movement along a track, the track having opposed rolling surfaces thereon and the carriage being movable along the track on at least two pairs of rollers, each pair of rollers having one roller running on each opposed rolling surface and the rollers in each pair being linked by a connecting means that maintains the roller in each pair of rollers at a fixed distance apart in use, the connecting means is pivotally mounted to the carriage such that when the track is of multiple curvature the connecting means pivots about the carriage maintaining both said rollers in each said pair of rollers in rolling contact with their respective track rolling surface at all times, wherein each of the at least two pairs of rollers comprises an adjustment means to allow the distance between the said rollers disposed on opposite sides of the track to be adjusted.

18. A flap deployment mechanism as claimed in claim 17 wherein each of the pairs of rollers comprises said adjustment means.

19. A flap deployment mechanism as claimed in claim 17 wherein the adjustment means is a cam style adjuster.

* * * * *